United States Patent [19]

Hermann

[11] 4,318,859
[45] Mar. 9, 1982

[54] PROCESS FOR THE PREPARATION OF BASIC DYESTUFFS

[75] Inventor: Karl H. Hermann, Leverkusen, Fed. Rep. of Germany

[73] Assignee: Bayer Aktiengesellschaft, Leverkusen, Fed. Rep. of Germany

[21] Appl. No.: 96,724

[22] Filed: Nov. 23, 1979

[30] Foreign Application Priority Data

Dec. 13, 1978 [DE] Fed. Rep. of Germany ....... 2853822

[51] Int. Cl.³ ................. C07C 15/12; C09B 11/04; C09B 11/10; C07D 209/04
[52] U.S. Cl. ................................. 260/388; 260/390; 260/391; 260/393; 260/315; 260/326.11 R; 260/326.8; 544/1; 544/106; 544/184
[58] Field of Search ............... 260/388, 390, 391, 393, 260/315, 326.11 R, 326.8; 544/106, 184, 1

[56] References Cited

U.S. PATENT DOCUMENTS

3,647,349  3/1972  Raue et al. .................. 260/393 X
3,828,071  8/1974  Kast et al. .................. 260/393 X
4,115,413  9/1978  Raue et al. .................. 260/393 X

*Primary Examiner*—Paul F. Shaver
*Attorney, Agent, or Firm*—Sprung, Felfe, Horn, Lynch & Kramer

[57] ABSTRACT

In order to prepare basic dyestuffs of the general formula

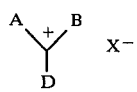

X⁻    I in which
A and B independently of one another represent a hetero-aromatic radical or a radical of the general formula

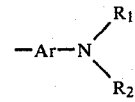

II in which
Ar denotes the grouping

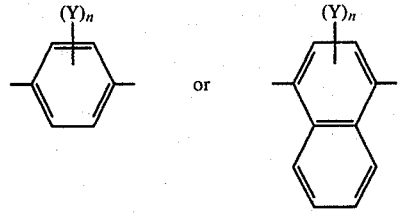

in which
Y represents hydrogen or a non-ionic substituent and n represents a number between 1 and 4, and
R₁ and R₂ represent hydrogen or alkyl, aryl or aralkyl which is optionally substituted by non-ionic or acid groups, or together, or with the o-position of Ar, form a heterocyclic ring,
D denotes hydrogen, alkyl, aryl which is optionally substituted by neutral or acid groups, or a hetero-aromatic radical and
X⁻ represents an anion,
compounds of the general formula

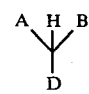

III in which
A, B and D have the abovementioned meaning, are oxidized with oxygen in the presence of catalytic amounts of benzoquinones which are substituted by halogen or cyano or of phenanthrenequinones which are substituted by nitro, and in the presence of catalytic amounts of nitrogen oxides, with the exception of dinitrogen monoxide, or of substances which produce such nitrogen oxides under the reaction conditions.

3 Claims, No Drawings

PROCESS FOR THE PREPARATION OF BASIC DYESTUFFS

The invention relates to a process for the preparation of basic dyestuffs of the general formula

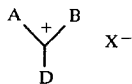    I in which
A and B independently of one another represent a hetero-aromatic radical or a radical of the general formula

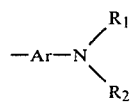    II in which
Ar denotes the grouping

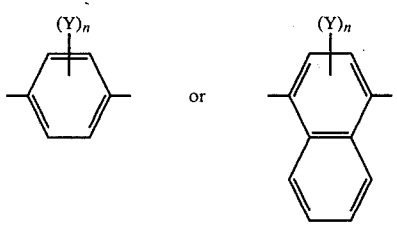

in which
Y represents hydrogen or a non-ionic substituent and n represents a number between 1 and 4, and
$R_1$ and $R_2$ represent hydrogen or alkyl, aryl or aralkyl which is optionally substituted by non-ionic or acid groups, or together, or with the o-position of Ar, form a heterocyclic ring,
D denotes hydrogen, alkyl, aryl which is optionally substituted by neutral or acid groups, or a heteroaromatic radical and
$X^-$ represents an anion,
characterised in that compounds of the general formula

    III in which
A, B and D have the abovementioned meaning, are oxidised with oxygen in the presence of catalytic amounts of benzoquinones with are substituted by halogen or cyano or of phenanthrenequinones which are substituted by nitro, and in the presence of catalytic amounts of nitrogen oxides, with the exception of dinitrogen monoxide, or of substances which produce such nitrogen oxides under the reaction conditions.

In the formulae, alkyl radicals are to be understood, in particular, as $C_1$–$C_4$-alkyl radicals. The alkyl radicals carry, for example, 1 to 3 of the non-ionic or acid substituents. Such substituents which may be mentioned are halogen, hydroxyl, $C_1$–$C_4$-alkyl, cyano, $C_1$–$C_4$-alkoxy, $C_1$–$C_4$-alkoxycarbonyl, $C_1$–$C_3$-alkylcarbonyloxy, aminocarbonyl, sulpho or carboxyl.

Halogen is to be understood, preferably, as fluorine, chlorine or bromine.

Particularly suitable aryl radicals are optionally substituted phenyl or naphthyl radicals.

Particularly suitable aralkyl radicals are optionally substituted benzyl, $\alpha$- or $\beta$-phenylethyl or $\alpha$-, $\beta$- or $\gamma$-phenylpropyl radicals.

These isocyclic radicals can carry, for example, 1 to 3 substituents such as halogen, $C_1$–$C_4$-alkyl, $C_1$–$C_4$-alkoxy, sulpho or carboxyl.

The radicals $R_1$ and $R_2$, together or with the o-position of Ar, form, for example, 5-membered or 6-membered rings; together they form, for example, a piperidine, pyrrolidine, morpholine or piperazine ring; with the o-position of Ar they form, for example, a tetrahydroquinoline, indoline, julolidine, phenomorpholine, tetrahydroquinoxaline or carbazole ring.

Hetero-aromatic rings D which may be mentioned are, above all, the indol-3-yl, pyrazol-4-yl and pyrazolin-5-on-4-yl rings. The heterocyclic rings are substituted, for example by $C_1$–$C_4$-alkyl groups or phenyl.

Amongst the dyestuffs described above, those of the general formula IV

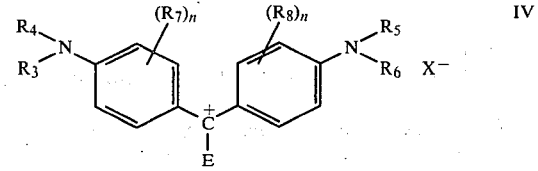    IV in which, independently of one another,
$R_3$ and $R_5$ denote hydrogen, $C_1$- to $C_4$-alkyl, hydroxyalkyl with two or three C atoms, cyanoethyl, alkoxyalkyl with a total of three to five C atoms, alkoxycarbonylalkyl with a total of three to eight C atoms, alkylcarbonyloxyalkyl with a total of three to eight C atoms, $C_1$- to $C_4$-halogenoalkyl, sulphoalkyl with two to four C atoms, cyclohexyl, benzyl, phenyl, phenethyl, phenyl which is substituted by halogen or $C_1$- to $C_4$-alkyl or -alkoxy, or sulphobenzyl,
$R_4$ and $R_6$ denote $C_1$- to $C_4$-alkyl, hydroxyalkyl with two or three C atoms, cyanoethyl, $C_1$- to $C_4$-halogenoalkyl, alkoxyalkyl with a total of three to five C atoms, alkoxycarbonylalkyl with a total of three to eight C atoms, alkylcarbonyloxyalkyl with a total of three to eight C atoms or benzyl or
$R_3$ and $R_4$ and/or $R_5$ and $R_6$ together form a pyrrolidine, piperidine, morpholine or piperazine ring which is optionally substituted by $C_1$–$C_4$-alkyl, or $R_3$, $R_4$, $R_5$ and/or $R_6$, together with the o-position of the phenyl ring, form a tetrahydroquinoline, indoline, julolidine, phenomorpholine, tetrahydroquinoxaline or carbazole ring which is optionally substituted by $C_1$–$C_4$-alkyl, phenyl or benzyl,
$R_7$ and $R_8$ represent hydrogen, $C_1$- to $C_4$-alkyl, $C_1$- to $C_4$-alkoxy or halogen,
n denotes an integer between 1 and 4 and
E denotes phenyl, phenyl or naphthyl which is monosubstituted or disubstituted by halogen, $C_1$- to $C_4$-alkyl, $C_1$- to $C_4$-alkoxy, nitro, the carboxyl group or the sulphonic acid group a heterocyclic radical of the general formula

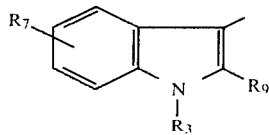

in which
R_9 denotes H, $C_1$–$C_4$-alkyl, phenyl, carboxylic acid $C_1$- or $C_2$-alkyl ester, carboxylic acid amide which is optionally N-substituted by $C_1$–$C_4$-alkyl, or $C_1$–$C_4$-alkoxy, or E denotes a radical of the general formula

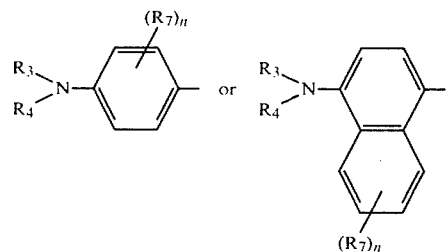

in which
n, $R_3$, $R_4$ and $R_7$ have the abovementioned meaning, or

E denotes a radical of the general formula

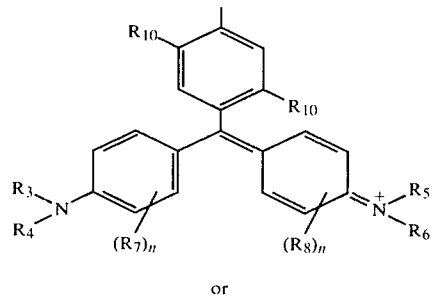

or

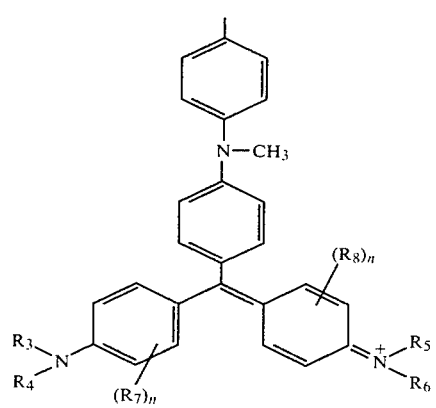

in which
$R_{10}$ denotes hydrogen, $C_1$–$C_4$-alkyl or halogen, in particular chlorine or bromine, and
n, $R_3$, $R_4$, $R_5$, $R_6$, $R_7$ and $R_8$ have the abovementioned meaning, and $X^-$ has the abovementioned meaning, can be particularly easily prepared.

Compounds of the general formula

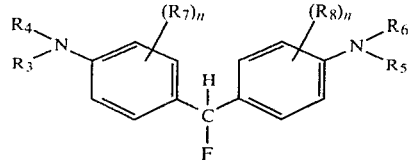

in which
n and $R_3$ to $R_8$ have the abovementioned meaning and
F is the same as E or is a radical of the general formula

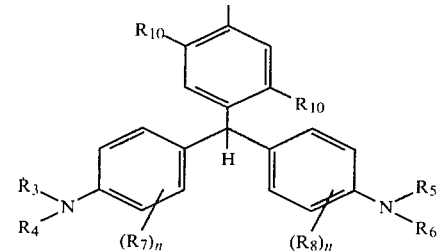

or

XII in which
n, $R_3$ to $R_8$ and $R_{10}$ have the abovementioned meaning, are used as starting materials for the preparation of the dyestuffs of the general formula IV.

Those dyestuffs of the general formula IV in which, independently of one another, $R_3$ and $R_5$ represent hydrogen, methyl, ethyl, hydroxyethyl, propyl or butyl, $R_4$ and $R_6$ represent methyl, ethyl, sulphobenzyl or sulphoethyl, $R_7$ and $R_8$ represent hydrogen, methyl, methoxy or chlorine, E represents phenyl, phenyl which is substituted by chlorine, methoxy or the sulphonic acid group, p-dimethylaminophenyl, p-diethylaminophenyl, p-bishydroxyethylaminophenyl or the radical of the general formula V in which
$R_9$ represents hydrogen, methyl or phenyl, and
$R_3$ represents methyl or phenyl,
are particularly preferred.

The anions are derived from inorganic or organic acids and are in general decided by the preparation process and by the purification of the crude dyestuff which may be carried out. In general, the dyestuffs are in the form of zinc chloride double salts, acetates, methosulphates, ethosulphates or halides (in particular chlorides or bromides). The anions can be replaced by other anions in a known manner.

The quinones employed as oxidising agents can be: tetrachloro-, tetrabromo-, tetrafluoro-, tetracyano- or dicyanodichloro-1,4-benzoquinone, tetrachloro- or tetrabromo-1,2-benzoquinone or 2-nitro-, 2,7-dinitro- or 4,5-dinitrophenanthrenequinone. Tetrachloro- and tetrabromo-1,4-benzoquinone are preferred. The quinones are employed in an amount of $10^{-3}$ to $10^{-1}$ mol, relative to the molar amount of the compound III. Instead of the quinones, it is also possible to use the corresponding hydroquinones.

Suitable catalysts are: nitrogen oxide or nitrogen dioxide or substances which liberate nitrogen oxides under the reaction conditions—above all in acid solvents—for example iron-III nitrate or sodium nitrite. The catalysts are used in concentrations of 1 to 20 mol percent, relative to the substrate.

The new process is carried out by a procedure in which compounds of the general formula III are dissolved or suspended in a neutral or acid, aqueous or organic solvent at temperatures between 0° C. and 150° C., preferably between 20° and 70° C., $10^{-3}$ to $10^{-1}$ mol of a quinone, relative to the molar amount of the compound III, is added, the reaction solution is mixed intensively with oxygen which is fed in, usually pure oxygen or air, and, in the course of the reaction, either 1 to 20 mol percent of nitrates or nitrites are added or a total of 1 to 20 mol percent of nitrogen oxides is metered in. The oxides can be metered in either with the stream of oxygen or from a separate metering device. In order to achieve a high rate of reaction, it is necessary to mix the gas and liquid intensively. It is also possible to carry out the reaction under pressure.

Examples of suitable solvents for the oxidation are: methylene chloride, chloroform, carbon tetrachloride, chlorobenzene, dichlorobenzene, benzene, toluene, xylene, cumene, acetic acid, propionic acid, lactic acid, dichloroethane, methanol, ethanol, propanol, isopropanol, butanol, glycol, methyl glycol, dimethyl glycol, tetrahydrofurane, dioxane, ethyl acetate, dimethylformamide, N-methylpyrrolidone or acetone or mixtures thereof. The reaction can also be carried out in aqueous solution or suspension or in a mixture of water and water-miscible solvents. The pH value of the reaction solution should be in the neutral to acid range, depending on the dyestuff. An acid pH range between pH 1 and pH 4 is preferred. The following examples illustrate the invention. Unless otherwise indicated, the parts relate to the weight.

EXAMPLE 1

99 parts of leuco-malachite green, 6 parts of chloranil and 600 parts of glacial acetic acid are subjected to intensive treatment with air at 30° C. In the course of the reaction—over a reaction time of about 12 hours—a total of 1.2 parts of a mixture of nitrogen monoxide and nitrogen dioxide, produced by treating sodium nitrite with sulphuric acid, is metered in uniformly. At the end of the reaction, 95% of the leuco-malachite green employed has been converted into malachite green. After evaporating off the glacial acetic acid, the dyestuff is treated with sodium hydroxide solution and precipitated as the carbinol base. After warming the carbinol base to 70° C. with oxalic acid and filtering the mixture, very clean, crystalline malachite green oxalate precipitates on cooling. Similarly good results are obtained if either 2.5 parts of sodium nitrite or 2.5 parts of iron-III nitrate are added uniformly, instead of the nitrogen oxides, during the atmospheric oxidation.

EXAMPLE 2

A mixture of 109.5 parts of the compound of the formula

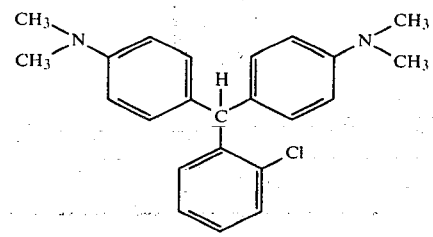

300 parts of glacial acetic acid, 300 parts of chlorobenzene and 6 parts of chloranil is gassed vigorously with air at 50° C. A total of 1.2 parts of a mixture of nitrogen monoxide and nitrogen dioxide is metered in continuously during the reaction. When the reaction has ended, the chlorobenzene and some of the glacial acetic acid are evaporated off in vacuo, the residue is taken up in hot $H_2O$, the aqueous mixture is acidified with dilute hydrochloric acid and filtered hot and the dyestuff is precipitated with sodium chloride. The dyestuff is obtained in 90% yield. Similar results are obtained if sodium nitrite or iron-III nitrate, instead of the nitrogen oxides, are used as the catalysts.

EXAMPLE 3

A suspension of 31.8 parts of the compound of the formula

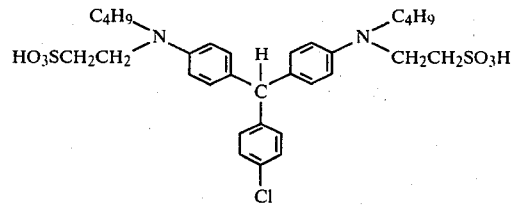

1 part of chloranil and 450 parts of water is treated with oxygen at 70° C., whilst stirring vigorously. A total of 0.5 part of a mixture of nitrogen monoxide and nitrogen dioxide is metered in continuously during the reaction. At the end of the reaction, 88% of the starting compound employed has been oxidised to the dyestuff. The dyestuff can be isolated by treating the reaction solution with sodium chloride. Similar results are obtained if sodium nitrite or iron-III nitrate, instead of the nitrogen oxides, are employed as catalysts.

EXAMPLE 4

107 parts of leuco-diamond green and 6 parts of chloranil are dissolved in 60 parts of glacial acetic acid and 500 parts of chloroform. A vigorous stream of air is passed through this solution at 30° C. In the course of the reaction, a total of 1.2 parts of a mixture of nitrogen monoxide and nitrogen dioxide is metered in. When the reaction has ended, the reaction solution contains diamond green in 92% yield.

EXAMPLE 5

118 parts of the compound of the formula

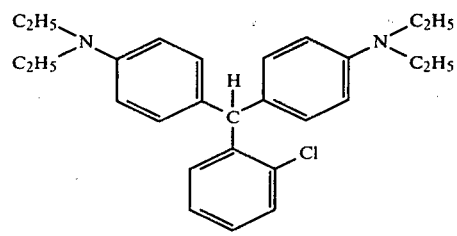

and 6 parts of chloranil are dissolved in 60 parts of glacial acetic acid and 500 parts of chloroform. Air is passed into this solution at 50° C., whilst stirring intensively. A total of 1.2 parts of a mixture of nitrogen monoxide and nitrogen dioxide is metered in at the same time as the stream of air. When the reaction has ended, the chloroform is evaporated off in vacuo, the residue is taken up in warm water, the aqueous mixture is filtered and the dyestuff is salted out with sodium chloride solution. The dyestuff is obtained in 87% yield.

The following leuco-compounds can also be oxidised in good yield by the process according to the invention.

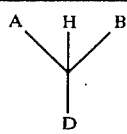

| Example | A | B | D |
|---|---|---|---|
| 6 | —⟨⟩—N(CH₃)₂ | —⟨⟩—N(CH₃)₂ | —⟨⟩—N(CH₃)₂ |
| 7 | " | " | bis[4-(dimethylamino)phenyl]methyl-(4-methylamino)phenyl |
| 8 | " | " | —⟨⟩(CH₃)—N(C₂H₄OH)₂ |
| 9 | " | " | 2-phenylindole |
| 10 | " | " | 1,2-dimethylindole |
| 11 | " | " | bis[4-(dimethylamino)phenyl]methyl-phenyl |
| 12 | —⟨⟩—N(CH₃)₂ | —⟨⟩—N(CH₃)₂ | HO, SO₃H naphthalene disulfonic acid |
| 13 | " | " | disulfonated N-ethyl-N-benzyl aniline |

-continued

| Example | A | B | D |
|---|---|---|---|
| 14 | " | " | 4-methyl-N,N-bis(3-sulfobenzyl)aniline |
| 15 | " | " | N-ethyl-N-(3-sulfobenzyl)-4-methyl-2-sulfoaniline |
| 16 | 4-methyl-N,N-diethylphenyl | 4-methyl-N,N-diethylphenyl | 4-methyl-N,N-diethylphenyl |
| 17 | " | " | 4-methyl-2,5-disulfophenyl |
| 18 | " | " | 5-methyl-2,6-disulfonaphthyl |
| 19 | N-ethyl-N-(3-sulfobenzyl)-4-methylphenyl | N-ethyl-N-(3-sulfobenzyl)-4-methylphenyl | 4-methyl-N,N-diethylphenyl |
| 20 | " | " | 2-chlorophenyl |
| 21 | " | " | 4-chlorophenyl |
| 22 | " | " | 4-sulfophenyl |
| 23 | " | " | 2-sulfophenyl |
| 24 | " | " | 4-(N,N-dimethylamino)phenyl |
| 25 | " | " | 3-methyl-4-(N,N-dimethylamino)phenyl |
| 26 | " | " | phenyl |
| 27 | N-(2-hydroxyethyl)-N-ethyl-4-methylphenyl | N-(2-hydroxyethyl)-N-ethyl-4-methylphenyl | 4-methyl-N,N-diethylphenyl |
| 28 | N-ethyl-2-methyl-4-methylaniline | N-ethyl-2-methyl-4-methylaniline | 2-chlorophenyl |
| 29 | N-ethyl-N-(benzyl-3-sulfo)-3-methyl-4-methylphenyl | N-ethyl-N-(benzyl-3-sulfo)-3-methyl-4-methylphenyl | 2-chlorophenyl |

-continued

| Example | A | B | D |
|---|---|---|---|
| 30 | " | " | 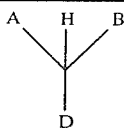 |
| 31 | 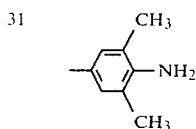 | 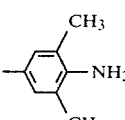 |  |
| 32 | 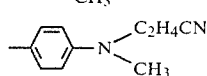 | 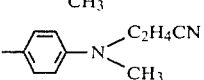 | 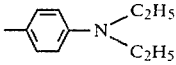 |
| 33 | " | " | 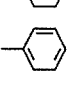 |
| 34 | 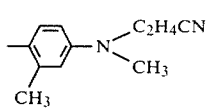 | 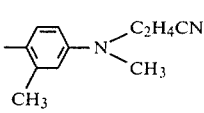 | — |

I claim:

1. Process for the preparation of basic dyestuffs of the general formula

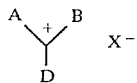 X⁻ in which
A and B independently of one another represent a hetero-aromatic radical or a radical of the general formula —Ar—N(R₁)(R₂)

in which
Ar denotes the grouping

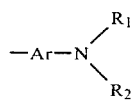 or 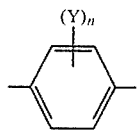

in which
Y represents hydrogen or a non-ionic substituent and
n represents a number between 1 and 4, and
R₁ and R₂ represent hydrogen or alkyl, aryl or aralkyl which is optionally substituted by non-ionic or acid groups, or together, or with the o-position of Ar, form a heterocyclic ring, D denotes hydrogen, alkyl, aryl which is optionally substituted by neutral or acid groups, or a heteroaromatic radical and
X⁻ represents an anion,
characterised in that compounds of the general formula

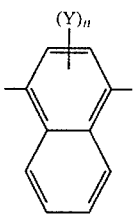

in which
A,B and D have the abovementioned meaning, are oxidised with oxygen in the presence of catalytic amounts of benzoquinones which are substituted by halogen or cyano or of phenanthrenequinones which are substituted by nitro, and in the presence of a catalytic amount of nitrogen monoxide, nitrogen dioxide, sodium nitrite or iron-III nitrate.

2. Process according to claim 1, characterised in that compounds of the general formula

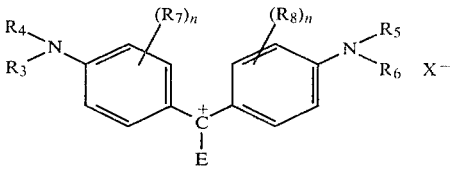

in which, independently of one another,
R₃ and R₅ denote hydrogen, C₁- to C₄-alkyl, hydroxyalkyl with two or three C atoms, cyanoethyl, alkoxyalkyl with a total of three to five C atoms, alkoxycarbonylalkyl with a total of three to eight C atoms, alkylcarbonyloxyalkyl with a total of three to eight C atoms, C₁- to C₄-halogenoalkyl, sulphoalkyl with two to four C atoms, cyclohexyl, benzyl, phenyl, phenethyl, phenyl which is substituted by halogen or $C_1$- to $C_4$-alkyl or -alkoxy, or sulphobenzyl, $R_4$ and $R_6$ denote $C_1$- to $C_4$-alkyl, hydroxyalkyl with two or three C atoms, cyanoethyl, $C_1$- to $C_4$-halogenoalkyl, alkoxyalkyl with a total of three to five C atoms, alkoxycarbonylalkyl with a total of three to eight C atoms, alkylcarbonyloxyalkyl with a total of three to eight C atoms or benzyl or $R_3$ and $R_4$ and/or $R_5$ and $R_6$ together form a pyrrolidine, piperidine, morpholine or piperazine ring which is optionally substituted by $C_1$-$C_4$-alkyl, or $R_3$, $R_4$, $R_5$ and/or $R_6$, together with the o-position of the phenyl ring, form a tetrahydroquinoline, indoline, julolidine, phenomorpholine, tetrahydroquinoxaline or carbazole ring which is optionally substituted by $C_1$-$C_4$-alkyl, phenyl or benzyl, $R_7$ and $R_8$ represent hydrogen, $C_1$- to $C_4$-alkyl, $C_1$- to $C_4$-alkoxy or halogen, n denotes an integer between 1 and 4 and E denotes phenyl, phenyl or naphthyl which is monosubstituted or disubstituted by halogen, $C_1$- to $C_4$-alkyl, $C_1$- to $C_4$-alkoxy, nitro, the carboxyl group or the sulphonic acid group, a heterocyclic radical of the general formula V

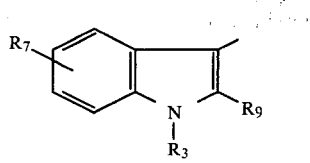

in which $R_9$ denotes H, $C_1$-$C_4$-alkyl, phenyl, carboxylic acid $C_1$- or $C_2$-alkyl ester, carboxylic acid amide which is optionally N-substituted by $C_1$-$C_4$-alkyl, or $C_1$-$C_4$-alkoxy, or E denotes a radical of the general formula

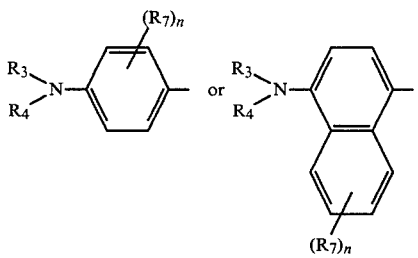

in which n, $R_3$, $R_4$ and $R_7$ have the abovementioned meaning, or

E denotes a radical of the general formula

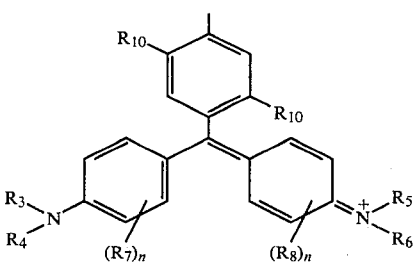

or

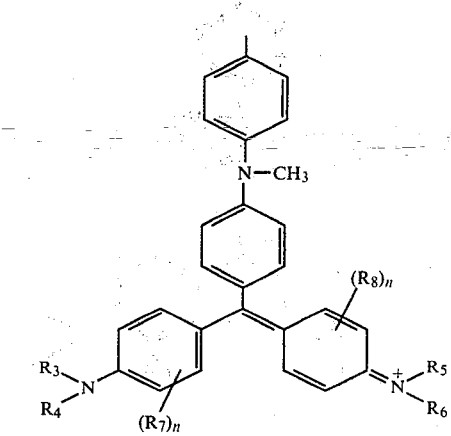

in which $R_{10}$ denotes hydrogen, $C_1$-$C_4$-alkyl or halogen, in particular chlorine or bromine, and n, $R_3$, $R_4$, $R_5$, $R_6$, $R_7$ and $R_8$ have the abovementioned meaning, and $X^-$ has the abovementioned meaning, are prepared by oxidising compounds of the general formula

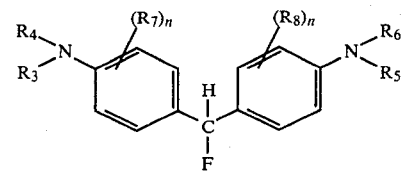

in which n and $R_3$ to $R_8$ have the abovementioned meaning and

F is the same as E or is a radical of the general formula

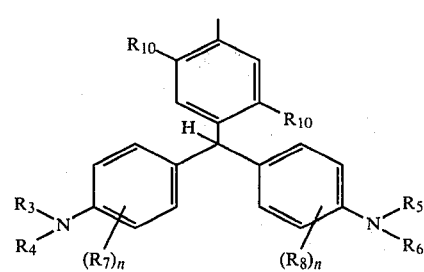

or

-continued

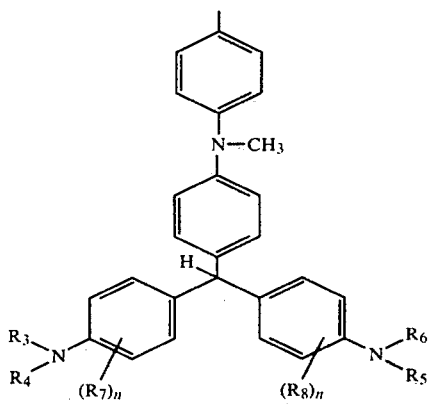

in which n, $R_3$ to $R_8$ and $R_{10}$ have the abovementioned meaning.

3. Process according to claim 2, characterised in that compounds of the formula in claim 2, wherein $R_3$ and $R_5$ represent hydrogen, methyl, ethyl, hydroxyethyl, propyl, cyanoethyl or butyl, $R_4$ and $R_6$ represent methyl, ethyl, sulphobenzyl or sulphoethyl, $R_7$ and $R_8$ represent hydrogen, methyl, methoxy or chlorine, E represents phenyl, phenyl which is substituted by chlorine, methoxy or the sulphonic acid group, p-dimethylaminophenyl, p-diethylaminophenyl, p-bishydroxyethylaminophenyl or the radical of the general formula

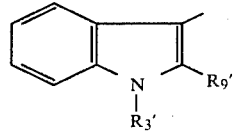

in which $r_3'$ represents hydrogen, methyl or phenyl and $R_9'$ represents methyl or phenyl, and n and $X^-$ have the meanings given in claim 2, are prepared by oxidising corresponding triarylmethane derivatives with oxygen in the presence of catalytic amounts of tetrachloro- or tetrabromo-1,4-benzoquinone and catalytic amounts of nitrogen monoxide and/or nitrogen dioxide.

* * * * *